United States Patent
Zepp et al.

(10) Patent No.: US 12,185,872 B1
(45) Date of Patent: Jan. 7, 2025

(54) GRIDDLE

(71) Applicant: ACCUTEMP PRODUCTS, INC., Fort Wayne, IN (US)

(72) Inventors: Lawrence P. Zepp, Fort Wayne, IN (US); Dale Taylor, Fort Wayne, IN (US)

(73) Assignee: AccuTemp Products, Inc., Fort Wayne, IN (US)

( * ) Notice: Subject to any disclaimer, the term of this patent is extended or adjusted under 35 U.S.C. 154(b) by 856 days.

(21) Appl. No.: 17/341,246

(22) Filed: Jun. 7, 2021

Related U.S. Application Data

(63) Continuation-in-part of application No. 16/551,251, filed on Aug. 26, 2019.

(60) Provisional application No. 62/890,975, filed on Aug. 23, 2019, provisional application No. 62/890,025, filed on Aug. 21, 2019.

(51) Int. Cl.
*A47J 27/00* (2006.01)
*A47J 36/02* (2006.01)
*A47J 37/06* (2006.01)
*B23K 20/12* (2006.01)

(52) U.S. Cl.
CPC ......... *A47J 37/0682* (2013.01); *A47J 27/002* (2013.01); *A47J 36/02* (2013.01); *B23K 20/12* (2013.01)

(58) Field of Classification Search
None
See application file for complete search history.

(56) References Cited

U.S. PATENT DOCUMENTS

| | | | |
|---|---|---|---|
| 1,247,101 A | 11/1917 | Fine | |
| 1,332,319 A | 3/1920 | Carpenter | |
| 1,405,181 A | 1/1922 | Bristol | |
| 2,152,534 A | 3/1939 | Carvalho et al. | |
| 2,318,380 A | 5/1943 | Davis et al. | |
| 2,318,381 A | 5/1943 | Davis et al. | |
| 2,353,985 A | 7/1944 | Barr | |
| 2,552,360 A | 5/1951 | Zichis | |
| 2,622,590 A | 12/1952 | Leroy et al. | |
| 2,664,911 A | 1/1954 | Thompson et al. | |
| 2,783,853 A | 3/1957 | Schaub | |
| 3,048,928 A | 8/1962 | Copson et al. | |

(Continued)

OTHER PUBLICATIONS

Armstrong Catalog 2004 Edition, Armstrong Steam and Condensate Group, Three Rivers, Michigan, 2 pages, www.armstrong-intl.com. Armstrong catalog, p. CG-7, 2004.

*Primary Examiner* — Elizabeth M Kerr
(74) *Attorney, Agent, or Firm* — Faegre Drinker Biddle & Reath LLP

(57) ABSTRACT

A steam chamber has enhanced planarity of its cooking surface, and a method for making the same via friction welding is provided. An array of stays within the steam chamber are friction welded to the undersurface of the upper plate, opposite the cooking surface, thus minimizing the heat affected zone and distortion of the cooking surface as compared, for example, to arc welding. A lower plate includes an array of holes sized and configured to be engaged by the array of stays, and is then welded to the array of stays via plug welds or rosette welds at the hole/stay junction. The resulting steam chamber preserves a high level of planarity in the cooking surface, while allowing the use of a relatively thin top plate for thermal and cooking efficiency.

16 Claims, 19 Drawing Sheets

(56) References Cited

U.S. PATENT DOCUMENTS

| | | | |
|---|---|---|---|
| 3,091,098 A | 5/1963 | Bowers | |
| 3,130,664 A * | 4/1964 | Jarmuth | A47J 37/0676 |
| | | | 219/94 |
| 3,234,645 A * | 2/1966 | Milton | B23K 20/12 |
| | | | 228/113 |
| 3,245,462 A * | 4/1966 | Ramer | A47J 37/0676 |
| | | | 99/422 |
| 3,311,991 A | 4/1967 | Rolf | |
| 3,342,703 A | 9/1967 | Leach | |
| 3,603,767 A | 9/1971 | Scicchitano | |
| 3,617,700 A | 11/1971 | Hooper | |
| 3,797,086 A | 3/1974 | Asselman | |
| 3,950,963 A | 4/1976 | Sutherland | |
| 3,968,787 A | 7/1976 | Basiulis | |
| 4,020,563 A | 5/1977 | Hoefer | |
| 4,245,147 A | 1/1981 | Cummings et al. | |
| 4,445,428 A | 5/1984 | Buford | |
| 4,608,917 A * | 9/1986 | Faaborg | A47J 37/067 |
| | | | 99/425 |
| 4,761,225 A | 8/1988 | Breslin | |
| 4,818,116 A | 4/1989 | Pardo et al. | |
| 4,955,361 A | 9/1990 | Sotani et al. | |
| 4,982,769 A | 1/1991 | Fournier et al. | |
| 5,195,427 A | 3/1993 | Germano | |
| 5,201,348 A | 4/1993 | Lurz | |
| 5,235,903 A | 8/1993 | Tippmann | |
| 5,318,792 A | 6/1994 | Tippmann | |
| 5,405,038 A | 4/1995 | Chuang | |
| 5,411,753 A | 5/1995 | Tippmann | |
| 5,743,014 A | 4/1998 | Giammaruti et al. | |
| 5,765,608 A | 6/1998 | Kristen | |
| 5,772,402 A | 6/1998 | Goodman | |
| 5,890,482 A * | 4/1999 | Farnsworth | A47J 37/0682 |
| | | | 126/41 R |
| 5,895,868 A | 4/1999 | Giammaruti et al. | |
| 5,964,255 A | 10/1999 | Schmidt | |
| 6,079,372 A | 6/2000 | Bekedam | |
| 6,103,289 A | 8/2000 | Tippmann et al. | |
| 6,145,431 A | 11/2000 | Tippmann et al. | |
| 6,148,875 A | 11/2000 | Breen | |
| 6,389,958 B1 | 5/2002 | Ono | |
| 6,520,071 B1 | 2/2003 | Lanza | |
| 6,539,839 B1 * | 4/2003 | Tippmann | A47J 37/0611 |
| | | | 99/425 |
| 6,619,189 B1 | 9/2003 | Tippmann et al. | |
| 6,626,088 B2 | 9/2003 | Ono | |
| 6,725,632 B2 | 4/2004 | Glucksman et al. | |
| 6,730,891 B1 | 5/2004 | Redmon | |
| 6,789,690 B2 | 9/2004 | Nieh et al. | |
| 6,792,982 B2 | 9/2004 | Lincoln et al. | |
| 6,971,418 B2 | 12/2005 | De Costa | |
| 6,994,227 B2 | 2/2006 | Kwon | |
| 7,003,928 B2 | 2/2006 | Patterson et al. | |
| 7,021,027 B2 | 4/2006 | Higer | |
| 7,048,136 B2 | 5/2006 | Havens et al. | |
| 7,076,929 B2 | 7/2006 | Patterson et al. | |
| 7,087,130 B2 | 8/2006 | Wu et al. | |
| 7,127,875 B2 | 10/2006 | Cheung | |
| 7,131,250 B2 | 11/2006 | Kahn et al. | |
| 7,138,025 B2 | 11/2006 | Wu et al. | |
| 7,490,452 B2 | 2/2009 | Alipour et al. | |
| 7,538,300 B1 | 5/2009 | Tippmann et al. | |
| 7,591,121 B2 | 9/2009 | Lin | |
| 7,614,203 B2 | 11/2009 | Oltrogge | |
| 7,625,459 B2 | 12/2009 | Wu et al. | |
| 7,677,165 B2 | 3/2010 | Adams | |
| 7,836,876 B2 | 11/2010 | Schellenberg | |
| 7,987,772 B2 | 8/2011 | Wolf | |
| 8,234,841 B2 | 8/2012 | Wild et al. | |
| 8,807,163 B2 | 8/2014 | Bell et al. | |
| 9,056,419 B2 | 6/2015 | Bell et al. | |
| 9,066,523 B2 | 6/2015 | Seitz et al. | |
| 9,289,094 B2 | 3/2016 | Wolf | |
| 9,346,135 B2 | 5/2016 | Jouhara et al. | |
| 9,423,150 B2 | 8/2016 | Cooper | |
| 10,092,128 B2 | 10/2018 | Seitz et al. | |
| 10,154,761 B2 | 12/2018 | Seitz | |
| 10,376,097 B1 | 8/2019 | Seitz | |
| 11,700,967 B2 | 7/2023 | Wolf et al. | |
| 2004/0000337 A1 | 1/2004 | Cooper | |
| 2004/0168685 A1 | 9/2004 | Lange | |
| 2005/0112269 A1 | 5/2005 | Ishibashi et al. | |
| 2006/0177299 A1 | 8/2006 | Hsu | |
| 2008/0223359 A1 | 9/2008 | Huang | |
| 2009/0071345 A1 | 3/2009 | Wolf | |
| 2010/0133254 A1 | 6/2010 | Lehman et al. | |
| 2013/0032579 A1 | 2/2013 | Barozzi | |
| 2016/0262563 A1 | 9/2016 | Wolf et al. | |
| 2017/0332838 A1 * | 11/2017 | Dahle | F24C 15/14 |
| 2018/0356101 A1 * | 12/2018 | Lee | F24C 15/18 |
| 2018/0368614 A1 | 12/2018 | Rudy et al. | |

* cited by examiner

US 12,185,872 B1

GRIDDLE

CROSS REFERENCE TO RELATED APPLICATION

This application is a continuation-in-part of U.S. patent application Ser. No. 16/551,251 filed Aug. 26, 2019, entitled GRIDDLE, which claims the benefit of U.S. Provisional Patent Application No. 62/890,025 filed Aug. 21, 2019 and U.S. Provisional Patent Application No. 62/890,975 filed Aug. 23, 2019, both entitled GRIDDLE. The entire disclosures of all of the above-identified applications are hereby expressly incorporated herein by reference.

BACKGROUND

1. Technical Field

The present disclosure relates to a method and apparatus for construction of a steam chamber griddle.

2. Description of the Related Art

Steam chambers, such as those used in manufacturing steam griddles, are filled with water and/or other boilable fluids and sealed. By activating a heating element, the fluid within the steam chamber is converted from a liquid to a gas, which rises within the steam chamber. When the gas contacts the top surface of the steam chamber, heat is transferred thereto. The opposing side of the top surface, i.e., the surface on the exterior of the steam chamber, may act as a cooking surface upon which food is placed to be cooked.

SUMMARY

The present disclosure provides a steam chamber with enhanced planarity of the cooking surface, and a method for making the same via friction welding. An array of stays within the steam chamber are friction welded to the undersurface of the upper plate, opposite the cooking surface, thus minimizing the heat affected zone and distortion of the cooking surface as compared, for example, to arc welding. A lower plate includes an array of holes sized and configured to be engaged by the array of stays, and is then welded to the array of stays via plug welds or rosette welds at the hole/stay junction. The resulting steam chamber preserves a high level of planarity in the cooking surface, while allowing the use of a relatively thin top plate for thermal and cooking efficiency.

In one form thereof, the present disclosure provides a steam chamber including a lower plate, an upper plate having a cooking surface and undersurface opposite the cooking surface, and at least one stay having an upper end welded to the upper plate and an opposed lower portion fixed to and extending through the lower plate, such that the at least one stay has a stay portion projecting below the lower plate.

In another form thereof, the present disclosure provides a steam chamber including an upper plate having a cooking surface and undersurface opposite the cooking surface, the cooking surface configured in a horizontal orientation, and a lower plate, the lower plate having a front portion defining a front depth, a back portion defining a back depth, and a lower surface extending from the front the front depth being greater than the back depth of the lower plate to define a difference therebetween, such that the lower surface defines a plane forming an angle relative to a plane of the cooking surface.

In yet another form thereof, the present disclosure provides a method of producing a steam chamber, including the steps of friction welding at least one stay to an undersurface of a first plate, the first plate having a cooking surface opposite the undersurface; and fixing a second plate to the first plate and to the at least one stay to create a hermetically sealed interior of the steam chamber, the at least one stay extending through and below the second plate.

BRIEF DESCRIPTION OF THE DRAWINGS

The above-mentioned and other features and advantages of this invention, and the manner of attaining them, will become more apparent and the invention itself will be better understood by reference to the following description of embodiments of the invention taken in conjunction with the accompanying drawings, wherein.

Figure 1:
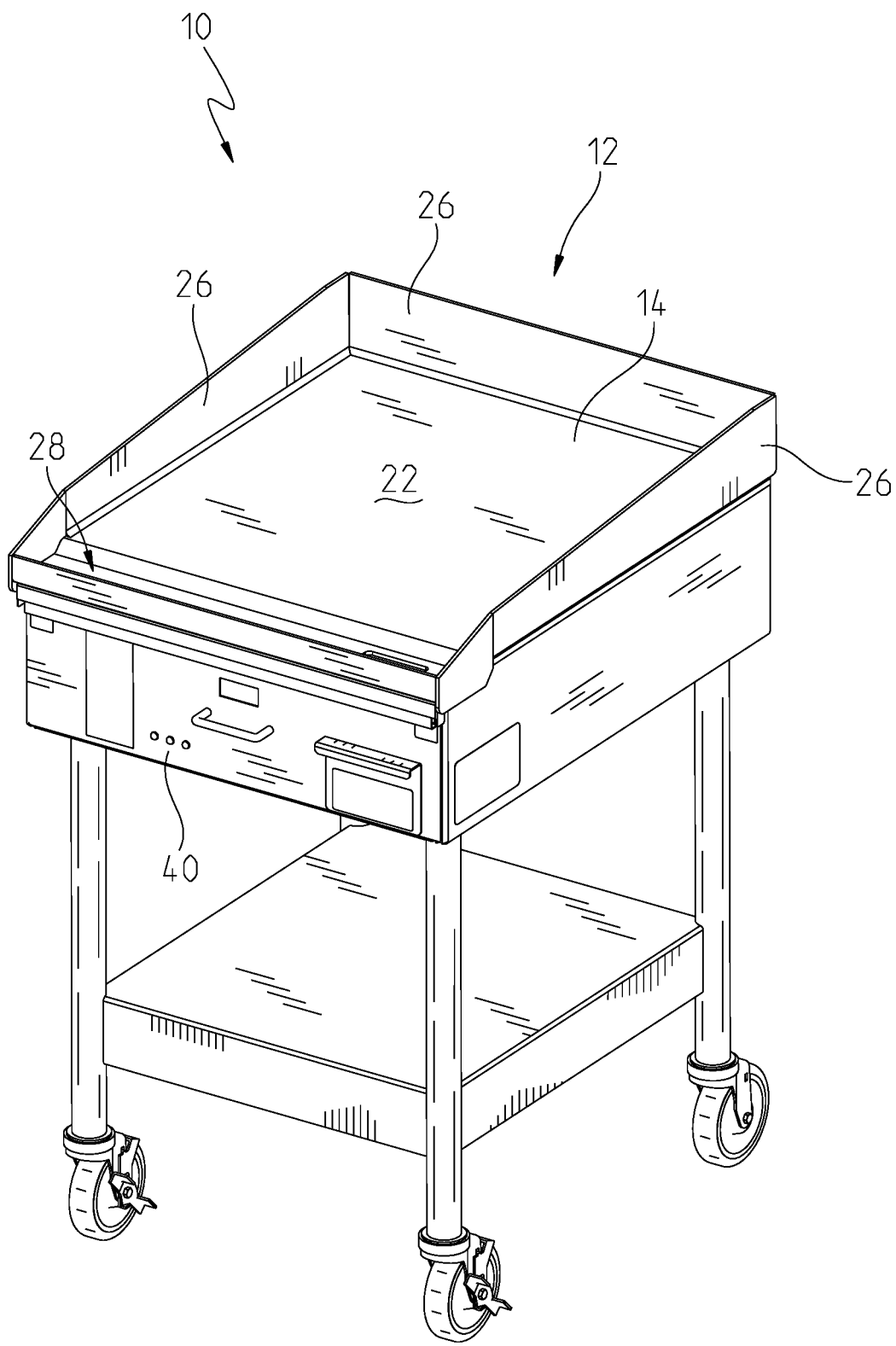
FIG. 1 is a perspective view of a steam griddle made in accordance with the present disclosure.

Corresponding reference characters indicate corresponding parts throughout the several views. The exemplifications set out herein illustrates embodiments of the invention, the embodiments disclosed below are not intended to be exhaustive or to be construed as limiting the scope of the invention in any manner.

DETAILED DESCRIPTION

Figure 2:
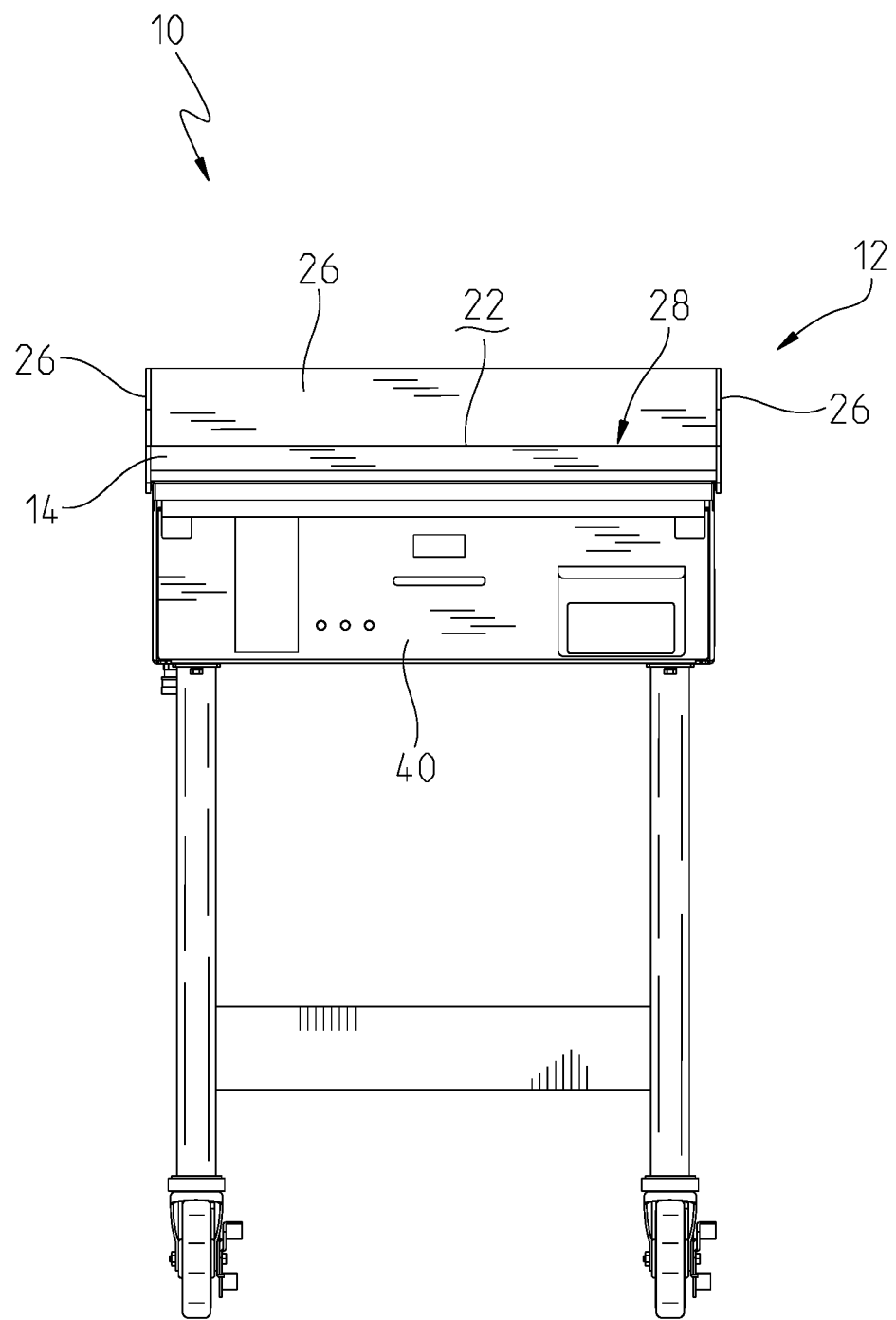
FIG. 2 is a front elevation view of the steam griddle of FIG. 1.
Figure 3:
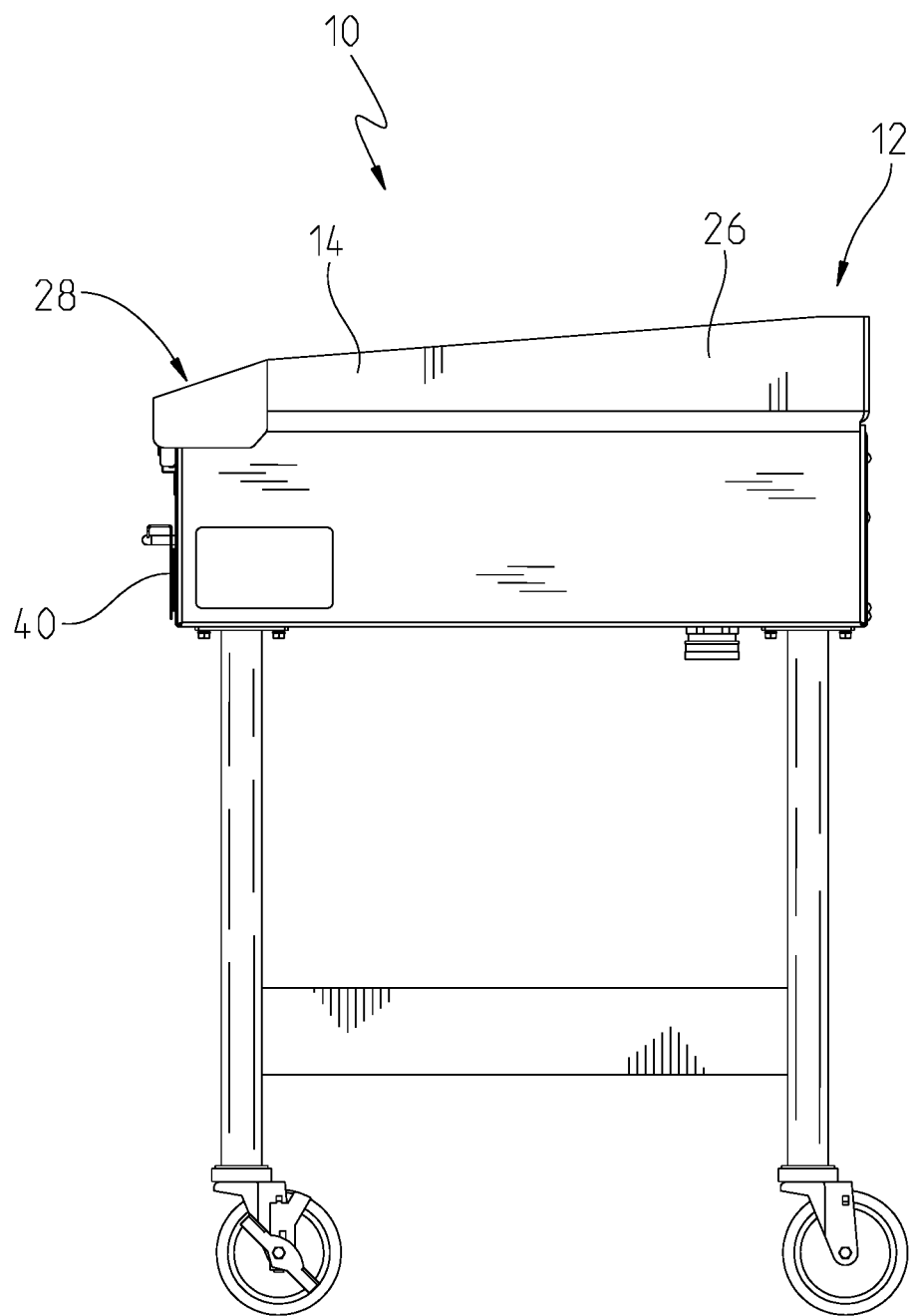
FIG. 3 is a side elevation view of the steam griddle of FIG. 1.

The present disclosure provides a steam griddle 10, shown in FIGS. 1-3, including a steam chamber assembly 12 shown in FIGS. 4-8. Except as otherwise described herein, steam griddle 10 may include all of the features and details of the steam griddle shown and described in U.S. Pat. No. 9,289,094, filed Sep. 17, 2007 and entitled METHOD AND APPARATUS FOR FILLING A STEAM CHAMBER, the entire disclosure of which is hereby expressly incorporated herein by reference. In the illustrative embodiment of FIGS. 1-3, steam chamber 12 is supported by a frame having a plurality of legs extending therefrom.

Figure 4:
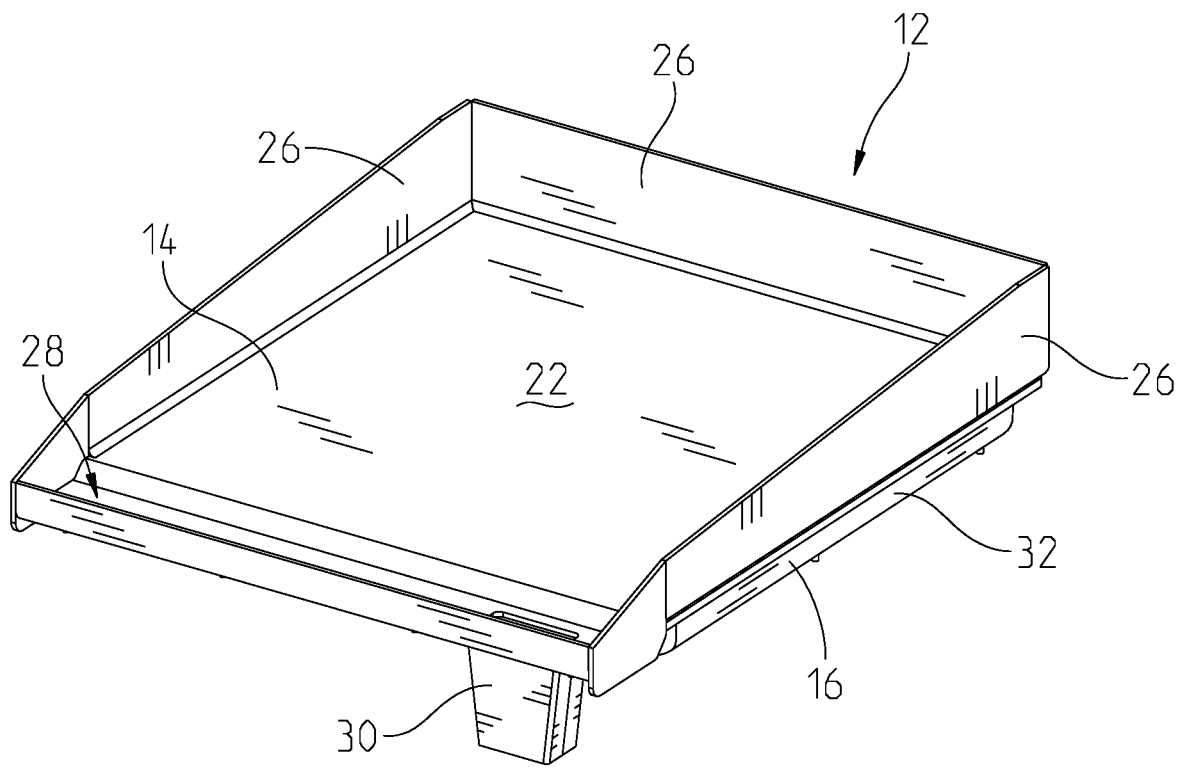
FIG. 4 is a perspective view of the steam chamber assembly used in the griddle of FIG. 1.
Figure 7:
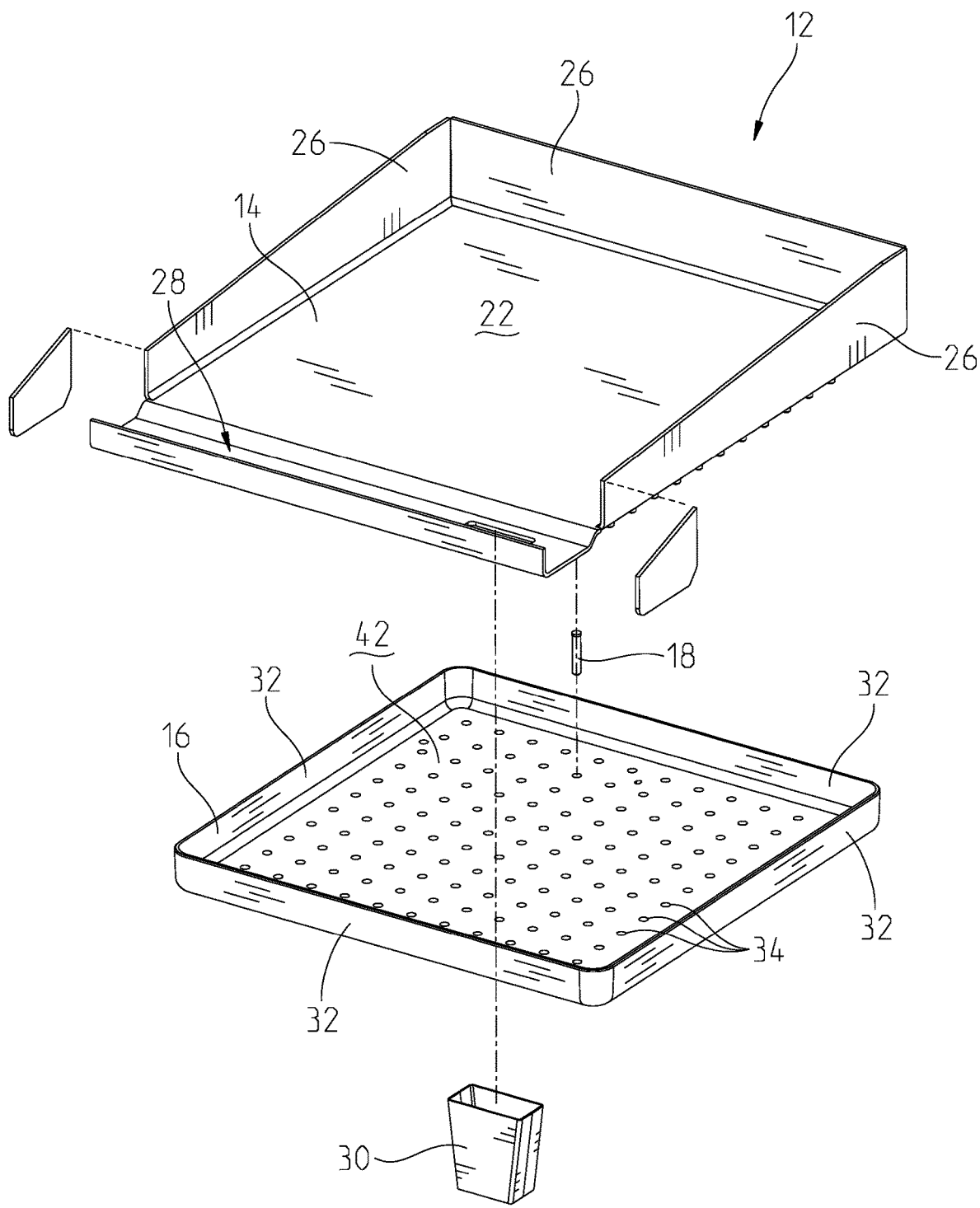
FIG. 7 is an exploded view of the steam chamber assembly of FIG. 4.
Figure 12:
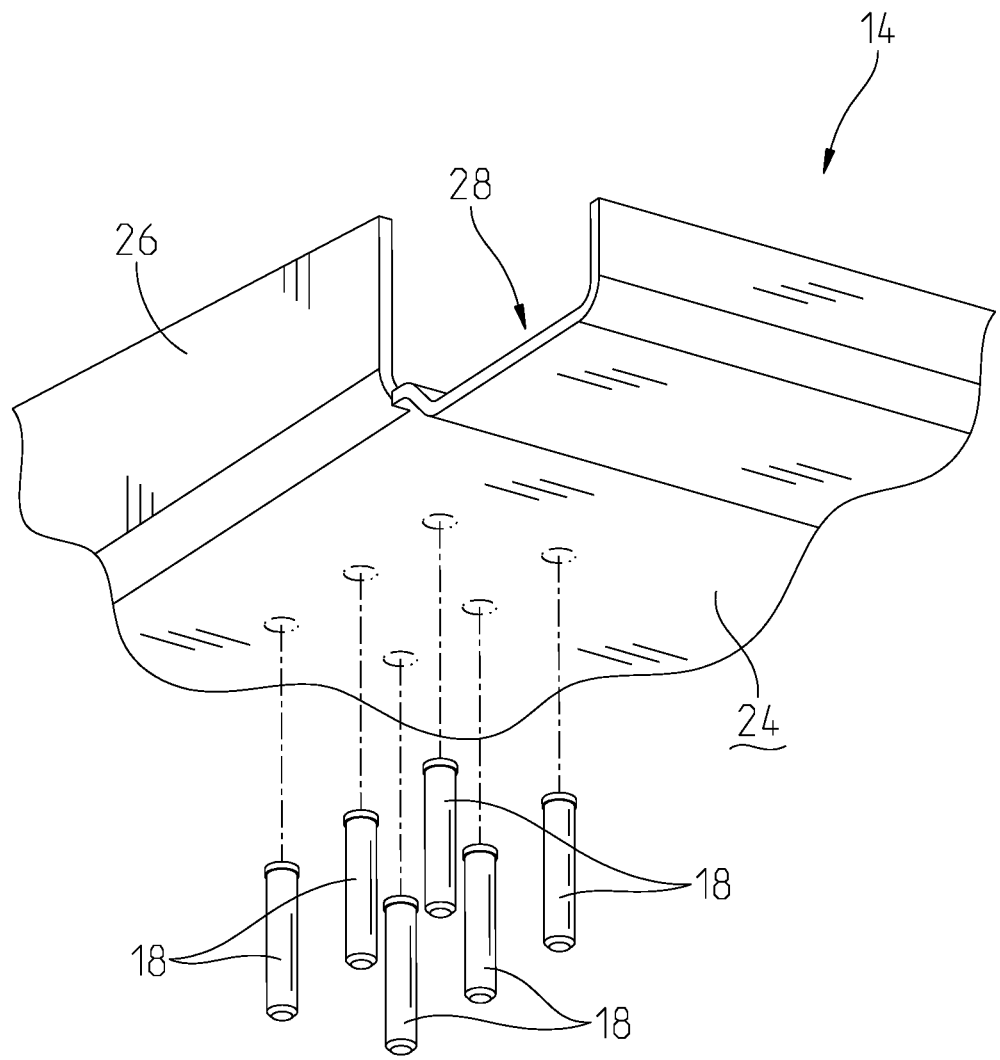
FIG. 12 is a cutaway, exploded, perspective view of a portion of the top plate of FIG. 9, illustrating attachment of stays to the undersurface of the top plate.
Figure 15:
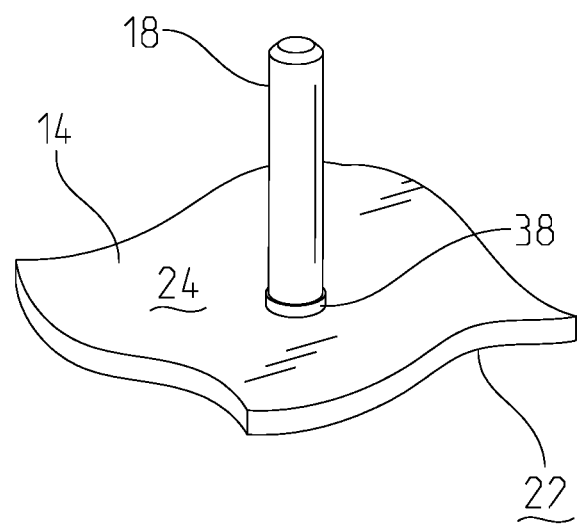
FIG. 15 is a cutaway, perspective view of the top plate of the steam chamber assembly of FIG. 4, illustrating a friction weld between a stay and the undersurface of the top plate.

As best seen in FIGS. 4-8, steam chamber assembly 12 includes an upper or top plate 14 having a cooking surface 22 facing outwardly (i.e., upwardly when in service) and an opposing lower surface, or undersurface 24. As described in further detail below, the undersurface 24 of top plate 14 has an array of stays 18 (FIGS. 7-9) evenly spaced across its surface and friction welded thereto (FIGS. 12 and 15). In the illustrated embodiment of FIG. 4, top plate 14 also includes upwardly extending sidewalls 26 formed as a portion thereof, which provide guarding at the left, right and back (i.e., distal) edges of cooking surface 22 (from the perspective of a cook or griddle operator). At the front or proximal edge of cooking surface 22, a trough 28 is provided for removal of grease or other cooking wastes. Trough 28 includes an aperture sized to receive grease trap 30, as best shown in FIGS. 4 and 7, which can collect accumulated grease and cooking wastes for later disposal.

Figure 13:
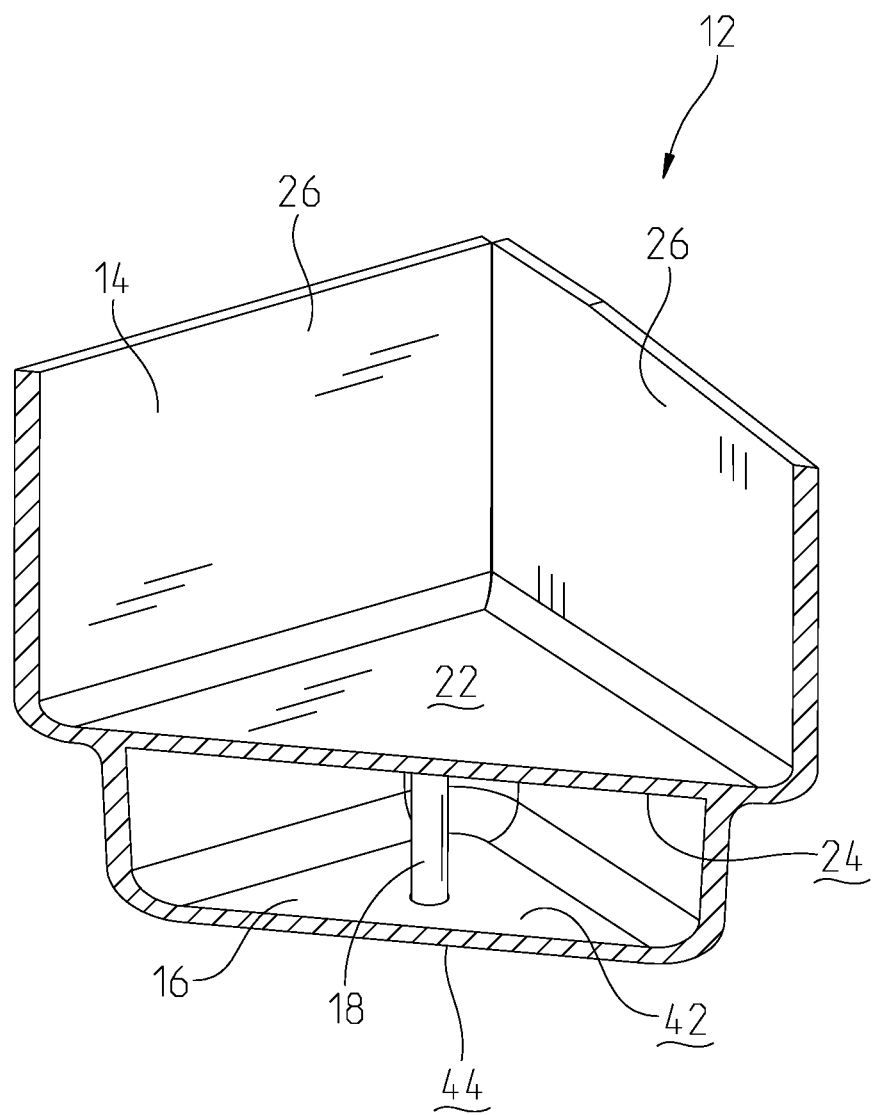
FIG. 13 is a cutaway perspective view of a portion of the steam chamber assembly of FIG. 4, illustrating a connection between the top and bottom plates via a friction-welded stay in accordance with the present disclosure.

Lower or bottom plate 16 of steam chamber assembly 12 is positioned below top plate 14 and includes a front, back, left and right walls 32 extending upwardly, as best seen in FIG. 7. Walls 32 of bottom plate 16 are configured to create an uninterrupted seam which may be abutted to undersurface 24 of top plate 14 (FIGS. 4-6 and 8), and this seam may then be welded (e.g., via arc welding). When so welded, and with stays 18 fixed within holes 34 of bottom plate 16 as described below and depicted by FIGS. 8 and 13, bottom plate 16 and top plate 14 cooperate to form a hermetically sealed pressure vessel (FIG. 14).

Figure 14:
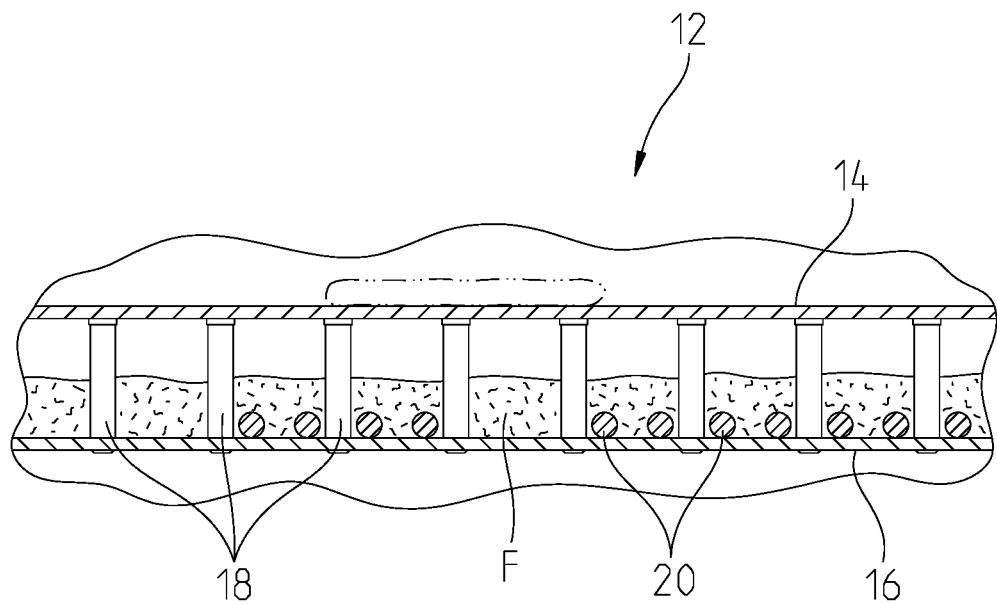
FIG. 14 is a side elevation, section view of the steam chamber assembly of FIG. 4, illustrating liquid and steam being used to cook a food item placed on the cooking surface of the top plate.

This sealed pressure vessel may include fill port 36 configured to selectively fill or drain heat transfer medium (e.g., water or other fluid F, as shown in FIG. 14 and described herein) from the interior of the vessel, while the remainder of otherwise impermeable to gas or liquid. In the illustrative embodiment of FIGS. 16 and 17, fill port 36 is included in bottom plate 16, and includes a threaded hole adapted to receive a correspondingly threaded plug for sealing port 36. An exemplary method and apparatus for filling and evacuating the interior of steam chamber assembly 12 is disclosed in U.S. Pat. No. 9,289,094, filed Sep. 17, 2007 and entitled METHOD AND APPARATUS FOR FILLING A STEAM CHAMBER, the entire disclosure of which is hereby expressly incorporated herein by reference.

Figure 16:
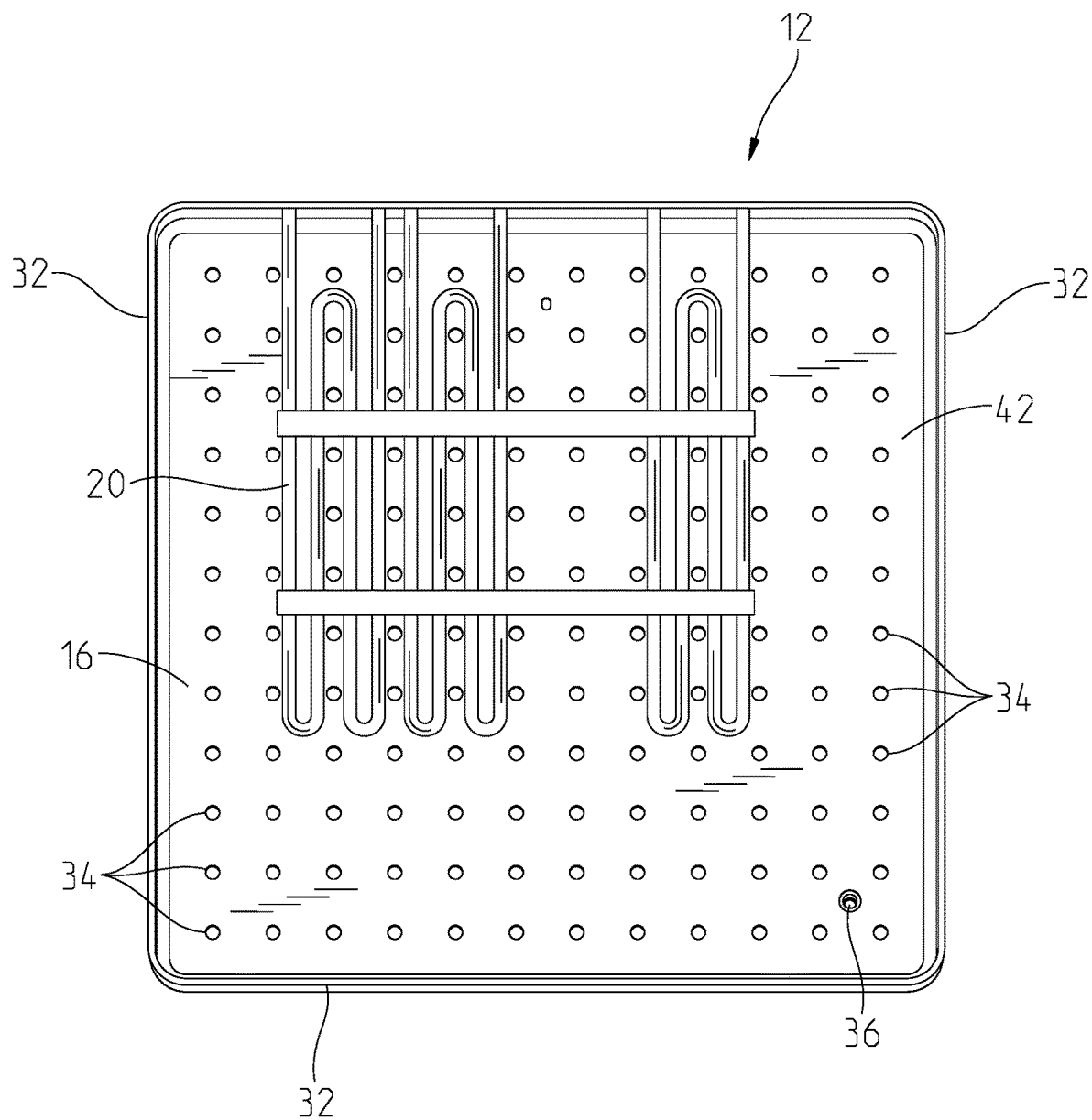
FIG. 16 is a perspective view of the interior of the steam chamber assembly of FIG. 4, shown with the top plate and array of stays not yet assembled.
Figure 17:
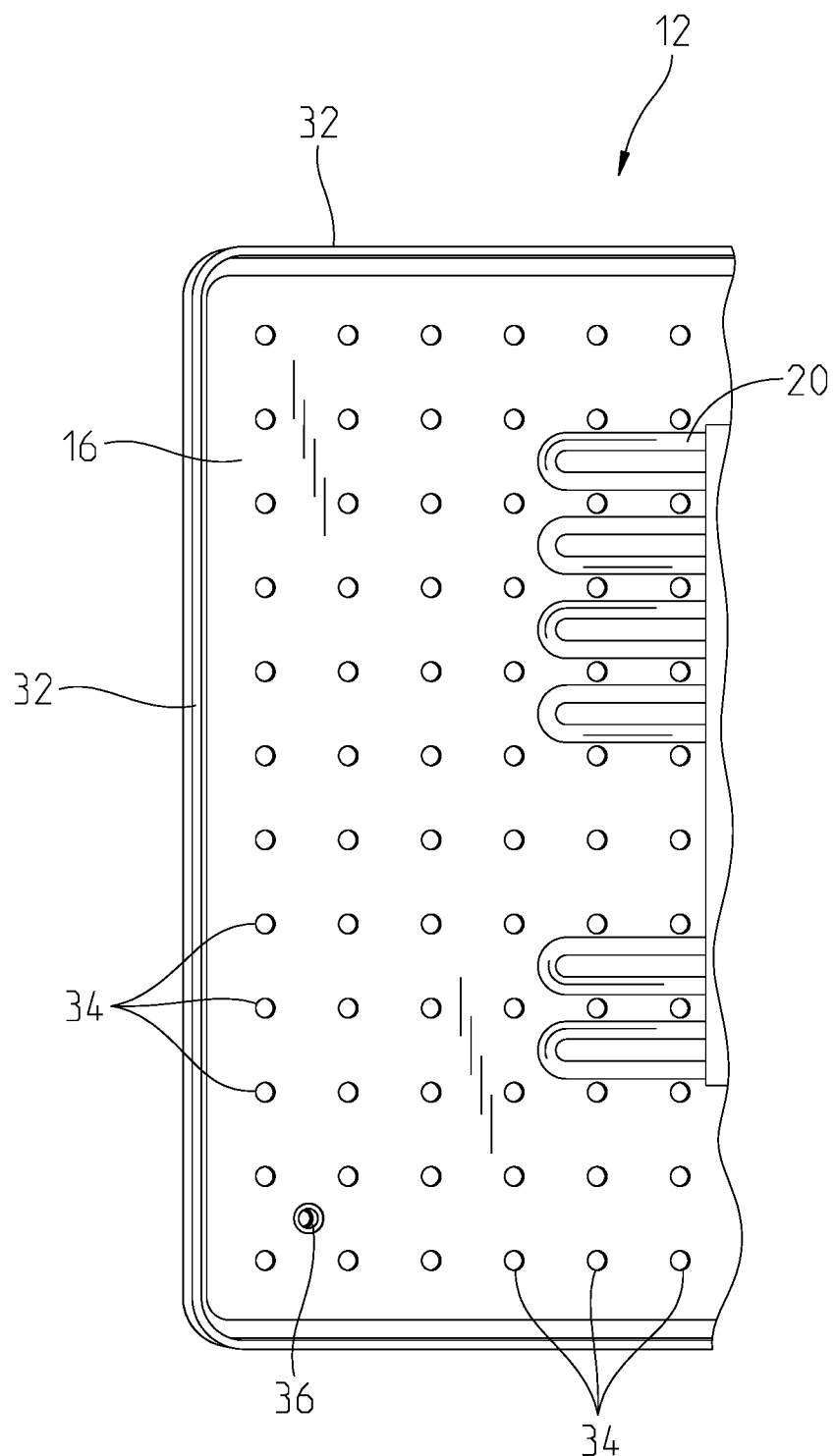
FIG. 17 is a perspective view of a portion of the interior of the steam chamber assembly shown in FIG. 16.

Contained within steam chamber 12 or positioned adjacent the bottom plate 16 of steam chamber 12 is a heating element 20 as shown in FIGS. 14 and 16-17. Heating element 20 may be an electric coil or gas burner, for example. Actuation of controller 40 (FIG. 1), such as via buttons or knobs, activate heating element 20. When activated, the heat emitted from heating element 20 boils the heat transfer medium, such as deaerated water, contained within steam chamber 12. As the heat transfer medium evaporates, the resulting steam or gas rises toward the undersurface of top plate 14, which conducts the heat to the cooking surface for cooking food placed thereon, as shown in FIG. 14.

Figure 11:
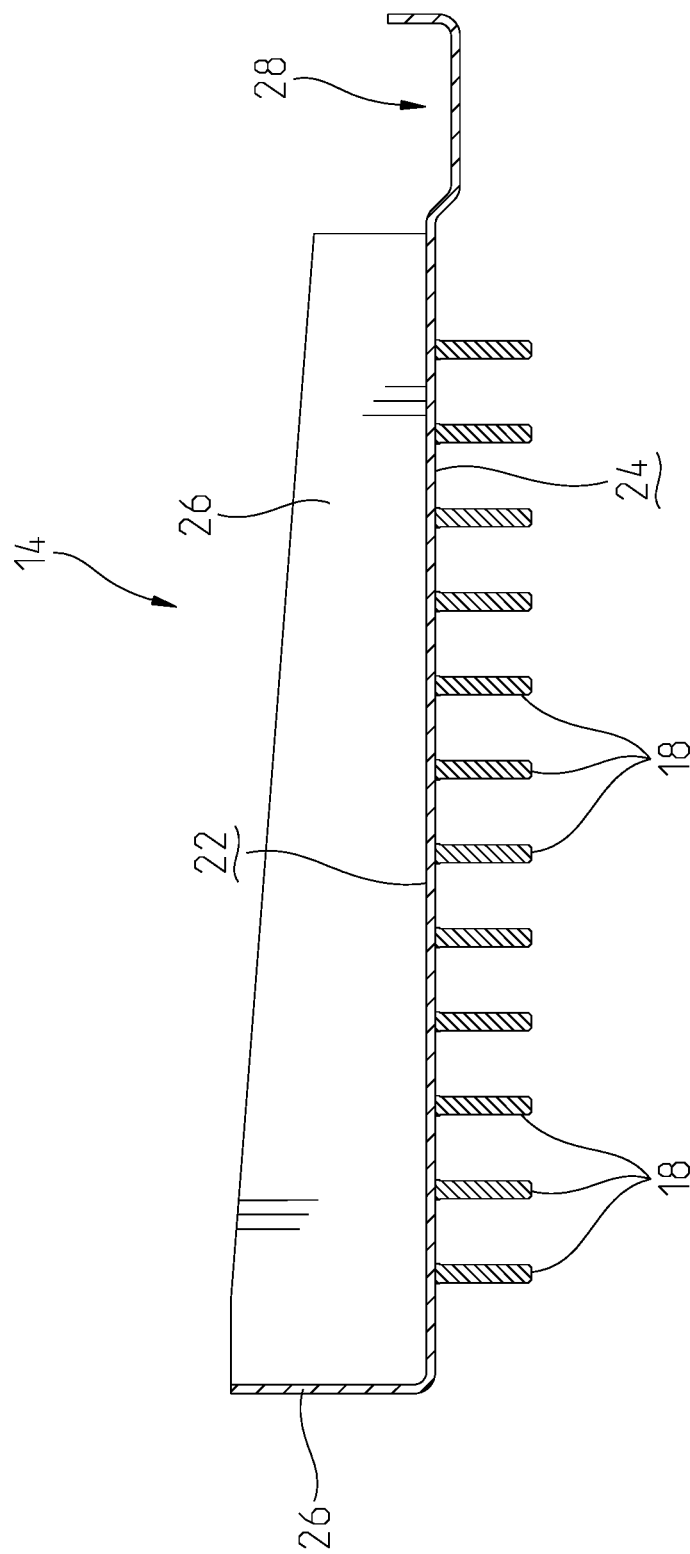
FIG. 11 is a side elevation, section view of the top plate of FIG. 9.

When the fluid F in steam chamber 12 (FIG. 14) is heated and changes phase from liquid to gas, the interior of steam chamber becomes pressurized. In some embodiments, for example, pressures up to 255 psi may be experienced within steam chamber 12 during heating and cooking operations. However, the cooking surface of top plate 14 is ideally maintained in a highly planar configuration, which facilitates cooking of food items thereon as well as the efficient scraping of waste from the cooking surface using a straight blade or spatula. In order to prevent pressure-induced deflection of the metal of top plate 14, an array of stays 18 (FIGS. 8 and 11) each span the distance between top and bottom plates 14, 16, and are fixed thereto. In one embodiment, stays 18 are formed as cylinders made of metal, such as stainless steel, and having a diameter between ¼ inch and ½ inch, such as about ⅜ inch and a length of between 1 inch and 3 inches, such as about 2 inches. Top plate 14 may also be made of stainless steel having a thickness of as little as 0.13 inches, 0.15 inches or 0.168 inches, or as much as 0.187 inches, 0.21 inches, 0.23 inches or 0.25 inches, for example, or may be any thickness within any range defined by any pair of the foregoing values. In one exemplary embodiment, the thickness of top plate 14 may be about 3/16 inches. This range of thicknesses for top plate 14 provides a cooking surface 22 which is robust and strong, but also thin enough to quickly transfer heat from the steam enclosed by steam chamber 12 to the food items above, even as the relatively cooler food items draw heat away from cooking surface 22. By contrast, thicker plates used for cooking surfaces, such as plates having a thickness of at least 0.75 inches to 1.0 inch may have a substantial thermal lag as steam heat from the interior passes slowly through the thick material to replace heat lost to cooking food items or other thermal disruptions on the cooking surface.

Figure 8:
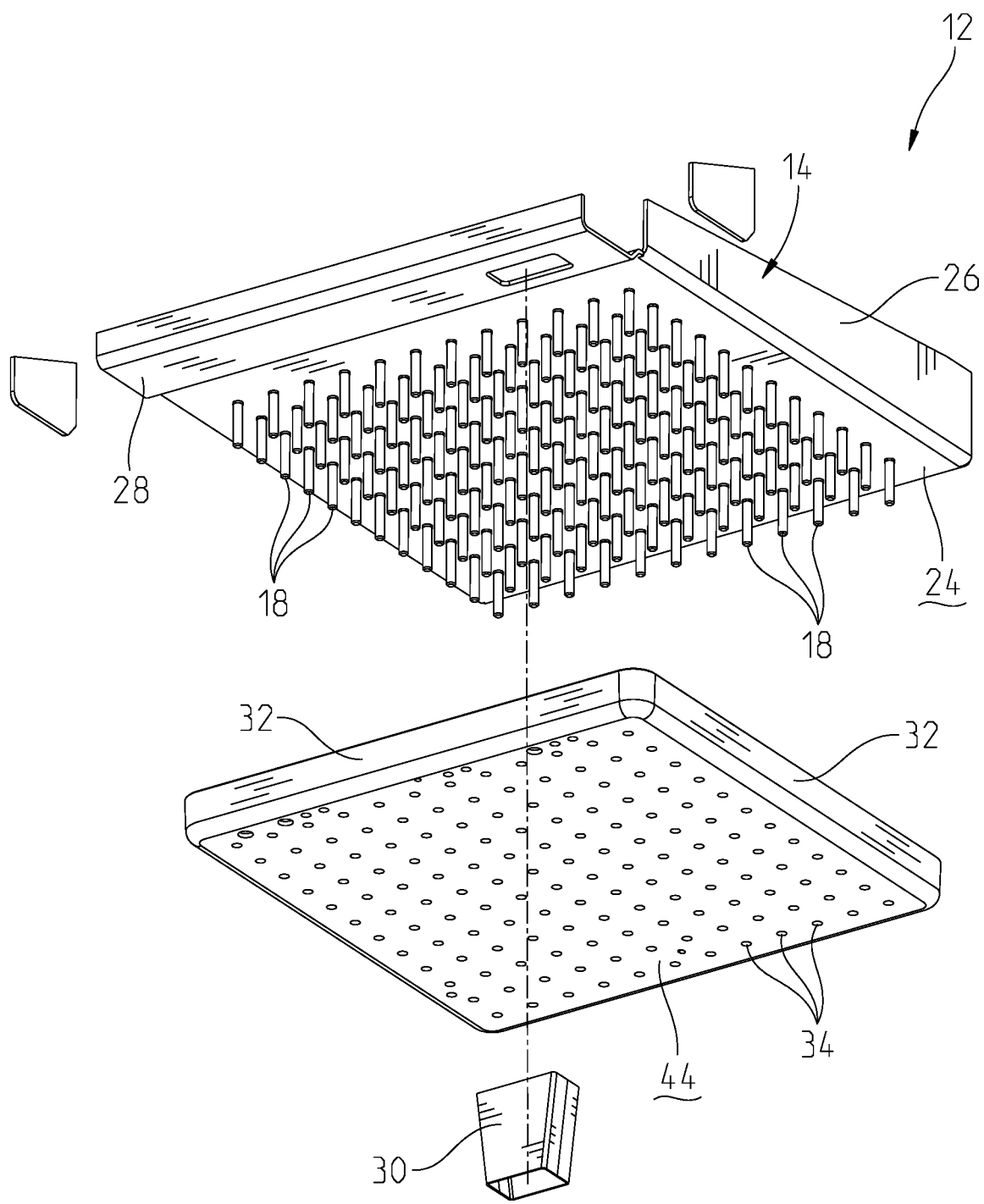
FIG. 8 is another exploded view of the steam chamber assembly of FIG. 4.
Figure 9:
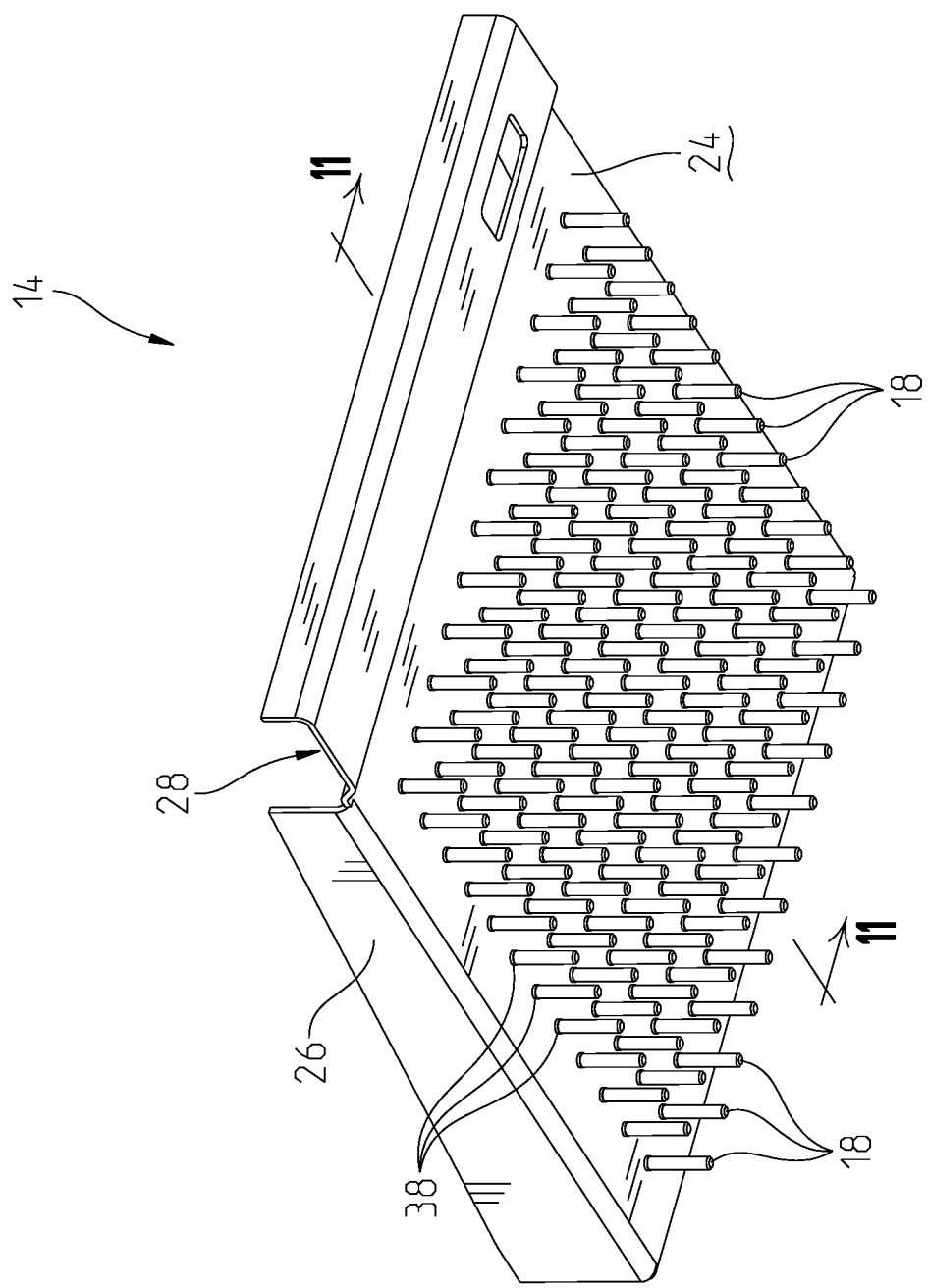
FIG. 9 is a perspective view of a top plate of the steam chamber assembly of FIG. 4, with an array of internal stays friction welded to an undersurface thereof.
Figure 10:
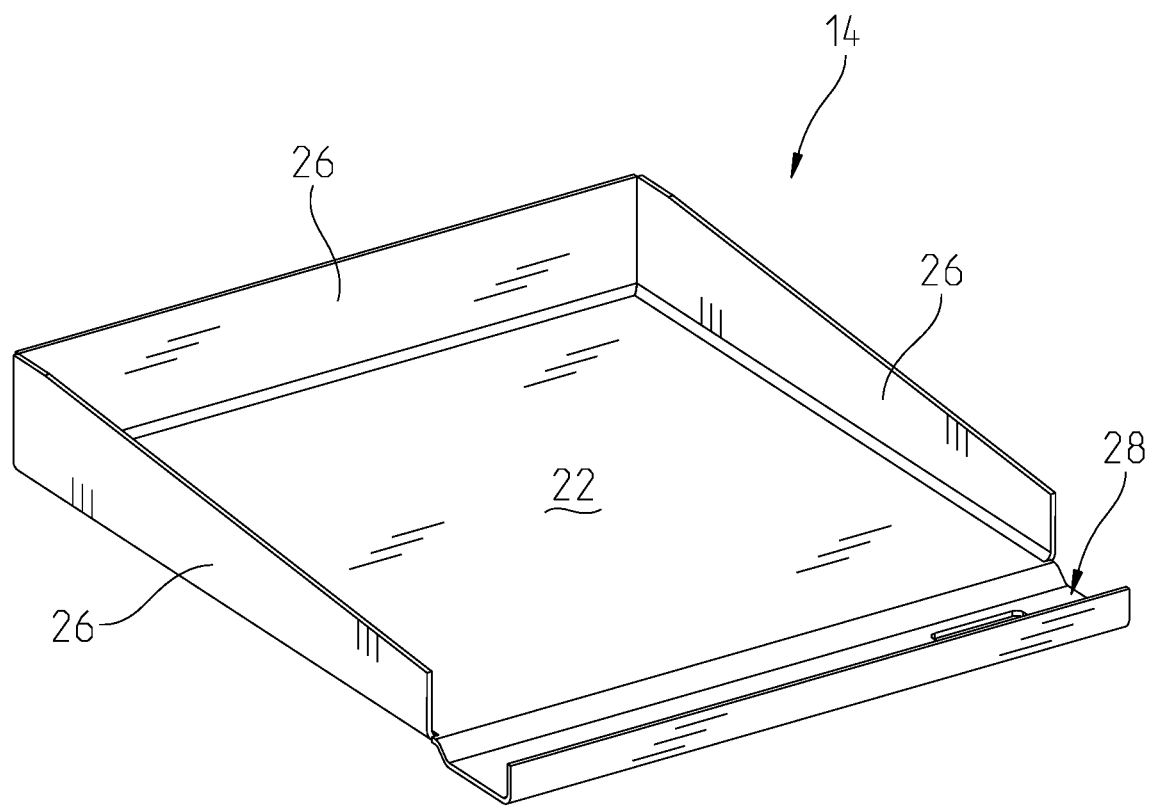
FIG. 10 is another perspective view of the top plate of FIG. 9, showing the upper cooking surface thereof.

Each of the array of stays 18 is fixed to undersurface 24 of top plate 14 via friction welding, thereby forming a neat, rounded and concentric weld bead 38 as shown in FIG. 15. Friction welding is a solid-state welding process that generates heat through mechanical friction between workpieces in relative motion to one another, with the addition of a lateral force called "upset" to plastically displace and fuse the materials. No melting occurs during friction welding, such that it is distinct from fusion welding processes (e.g. arc welding). To effect such friction welding in the context of steam chamber 12, a stay 18 is rotated at high speed by a friction welding machine, which then brings the end of the spinning stay 18 into abutting contact with the undersurface of top plate 14 at a designated location. Pressure is applied to this abutting contact as the stay 18 continues to spin, creating heat and friction which locally fuses the metal to create weld bead 38 (FIG. 15). This process is repeated for each of the array of stays 18 (FIGS. 8 and 9). The resulting weld zone has a wrought microstructure of the type normally founding in forging operations, as distinct from the solidification microstructure produced by fusion welding. Thus, a friction welded structure, such as stays 18 joined to plate 14, is structurally distinct from a fusion welded structure, and this difference can be readily ascertained by microstructural examination of the product itself by any of various well-known methods, including electron microscopy.

Advantageously, the friction welding process preserves the original parent material chemistry (e.g., the alloy constituency), and the microstructure, including the interstitial arrangement of the parent material. This, in turn, preserves the tensile strength and mechanical characteristics of the parent material. By contrast, other forms of welding such as fusion welding chemically change the materials in the location of the co-mixing or joint of the parent materials as a result of the high heat to melt the parent materials. This can modify the alloy constituency and microstructure of the parent materials, affecting their mechanical properties and possibly reducing the strength of the joint.

In one exemplary welding process using ⅜-inch diameter stainless steel stays 18 joined to a 3/16-inch thick stainless steel top plate 14, friction welding may be effected by rotating a stay 18 at about 7000-8000 rpm, then bringing the rotating stay 18 into contact with plate 14 using a peak pressure of about 2500-3500 lbs for about 3 seconds. The welding rpm and pressure of this exemplary friction welding process departs significantly from the standard welding conventions of 20,000-25,000 rpm and 1500 lbs. of force. The standard welding conventions were based on using the highest available rpm and lightest force to produce the weld with minimum distortion. However, further friction weld development for griddle 10 found that a counter-intuitive process of much lower rpm and much higher force produced dramatically less distortion and was the superior process. For an exemplary griddle 10, stays 18 may be welded at a spacing of about 1.75 inches from one another across the entirety of undersurface 24, except for a margin of between 2 and 3 inches around the periphery of undersurface 24. This pattern provides a highly planar cooking surface 22 even in the presence of high pressures within steam chamber 12, as described herein.

Advantageously, stays 18 that have been friction welded to top plate 14 provide a precise and reliable weld with a minimum of heat distortion as compared to fusion welded structures (e.g., stays arc welded to the undersurface of a cooking plate). For example, when the aforementioned ⅜-inch diameter stays 18 are friction welded to the aforementioned 3/16 thickness plate (and both are made of stainless steel), peak temperatures are about 2500 degrees Fahrenheit compared to a more typical peak of 5000-10000 degrees Fahrenheit associated with arc welding. This results in elimination or substantial reduction of a heat-affected zone in steam chamber 12, compared to an expected heat-affected zone extending at least 50% through the material thickness for arc welded structures. The heat affected zone (or lack thereof) can be examined and observed after the welding process by cross section, polishing and etching, for example.

This minimization of the heat-affected zone, in turn, also minimizes distortion of cooking surface 22, preserving a high degree the planarity across the entire extent of cooking surface 22. For example, when the aforementioned ⅜-inch diameter stays 18 are friction welded to the aforementioned 3/16 thickness top plate 14 (and both are made of stainless steel), heat distortion zones formed in cooking surface 22 are limited to about ⅜-inches in diameter, with deviation from planarity within this diameter being limited to between 0.5 thousandths of an inch and 1.5 thousandths of an inch through the area on the cooking surface adjacent to the weld. This "adjacent" area is the area of the weld transposed across the thickness of top plate 14 along a direction perpendicular to surfaces 22, 24. By contrast, typical fusion welded joints for this same geometry would typically include a heat-distorted zone about ¾-inches in diameter and having a deviation from planarity within this zone of between 5 thousandths of an inch and 7 thousandths of an inch. In use, the high degree of planarity maintained along cooking surface 22 of top plate 14 facilitates a large reduction in effort when scraping the surface clean with a long straight edge, as may be done by cooks or operators removing char or other detritus from cooking surface 22.

As noted above and shown in FIGS. 7-8 and 16-17, bottom plate 16 has an array of holes 34 formed therethrough. These holes 34 are sized and positioned to receive the lower ends of stays 18, i.e., the ends opposite the friction weld bead 38 formed between stays 18 and top plate 14. In the exemplary embodiment shown in FIG. 13, the bottom ends of stays 18 optionally have a stepped-down diameter to interfit tightly with the holes 34 in bottom plate 16. When so interfitted, a plug weld or rosette weld can be applied to the exterior, lower surface 44 of bottom plate 16 (FIG. 8), at the exposed junction between the sidewall of each hole 34 and the adjacent stay 18. This allows for fixation of the two parts together from the exterior, without any need for physical access to the interior surface 42 of bottom plate 16. This, in turn, facilitates creation of the hermetically sealed interior of steam chamber 12.

Figure 18:
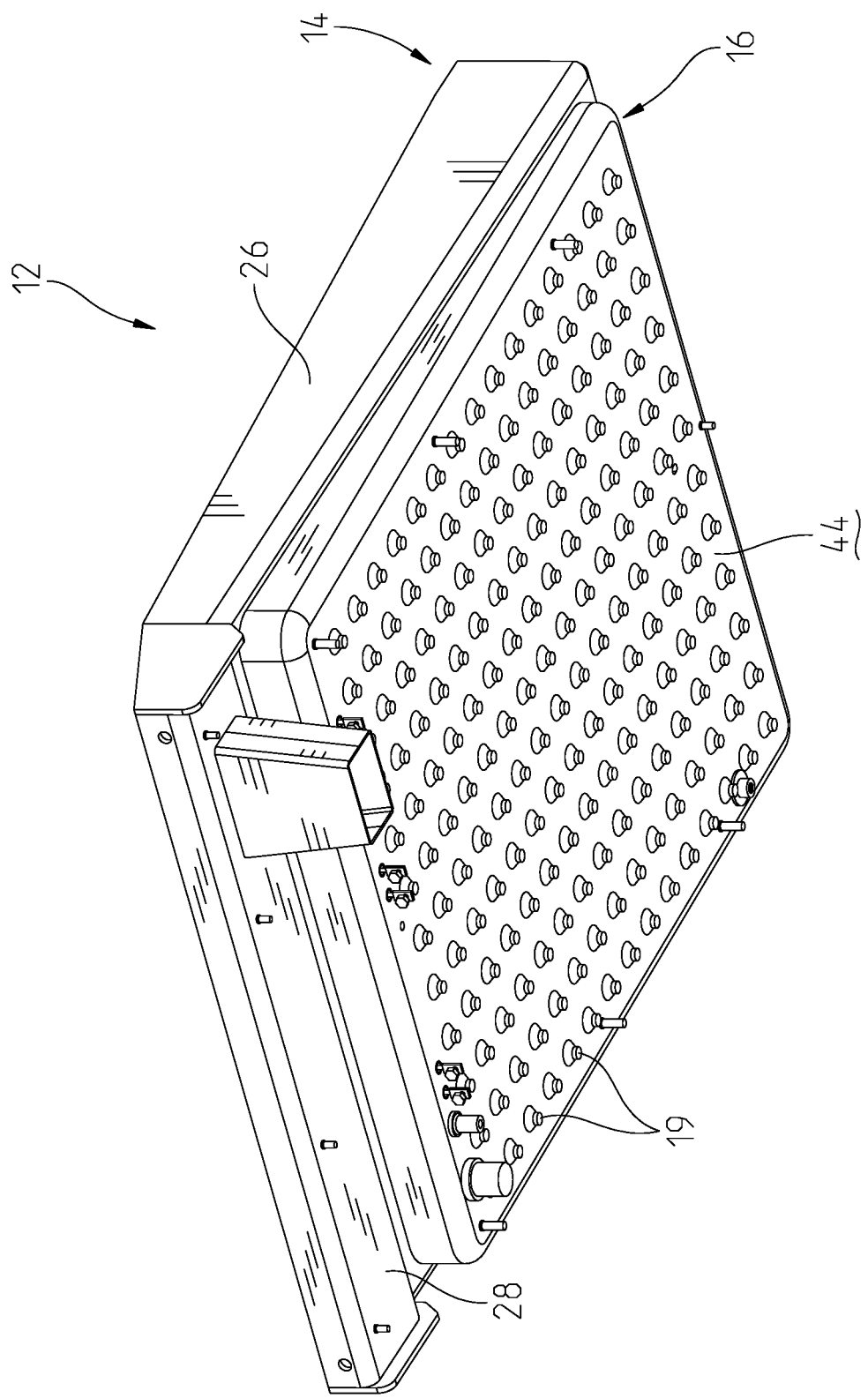
FIG. 18 is a bottom perspective view of another steam chamber assembly made in accordance with the present disclosure.
Figure 19:
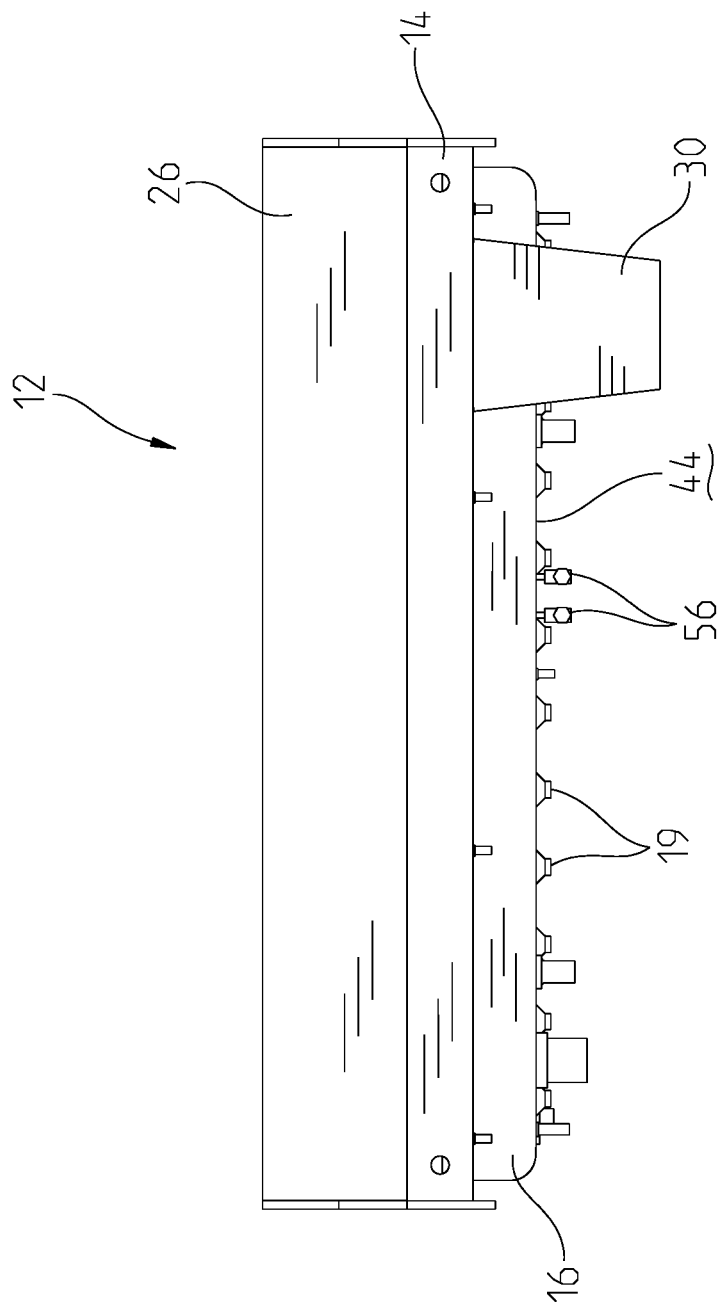
FIG. 19 is a front view of the steam chamber assembly of FIG. 18.
Figure 20:
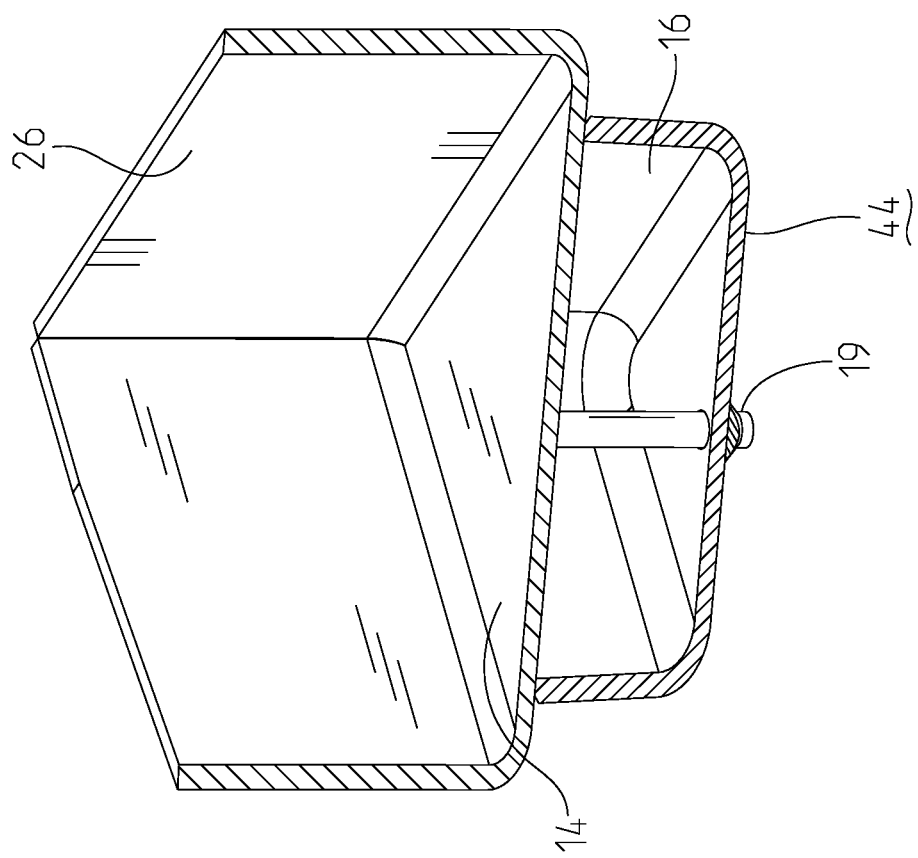
FIG. 20 is a cutaway perspective view of a portion of the steam chamber assembly of FIG. 18.

Referring now to FIGS. 18-21, an alternative embodiment of steam chamber 12 is shown in which stays 18 are replaced by longer stays 19, such that stays 19 project below the exterior, lower surface 44 of bottom plate 16. Steam chamber 12 as depicted in FIGS. 18-20 may be constructed and used in all the same ways as described above, except as otherwise described below specifically with respect to FIGS. 18-21.

FIG. 18 is a bottom perspective view of steam chamber 12, illustrating top plate 14 and bottom plate 16. As illustrated best in FIG. 20, stays 19 extend from the lower surface of the top plate 14 to and through the hole 34 formed in the bottom plate 16. Further, stays 19 extend downwardly beyond the lower surface of the bottom plate 16, and an outer surface of the lower portions of each of stays 19 is welded to the adjacent surface surrounding each hole 34 (FIG. 7) of bottom plate 16. In the illustrated embodiment, a rosette weld may be used at the circular joint between the outer surface of stay 19 and the adjacent undersurface of bottom plate 16. In this way, stays 19 each have a lower portion extending downwardly and projecting below a lower surface 44 of bottom plate 16 to create a dimpled, rather than smooth, undersurface of steam chamber 12.

Figure 21:
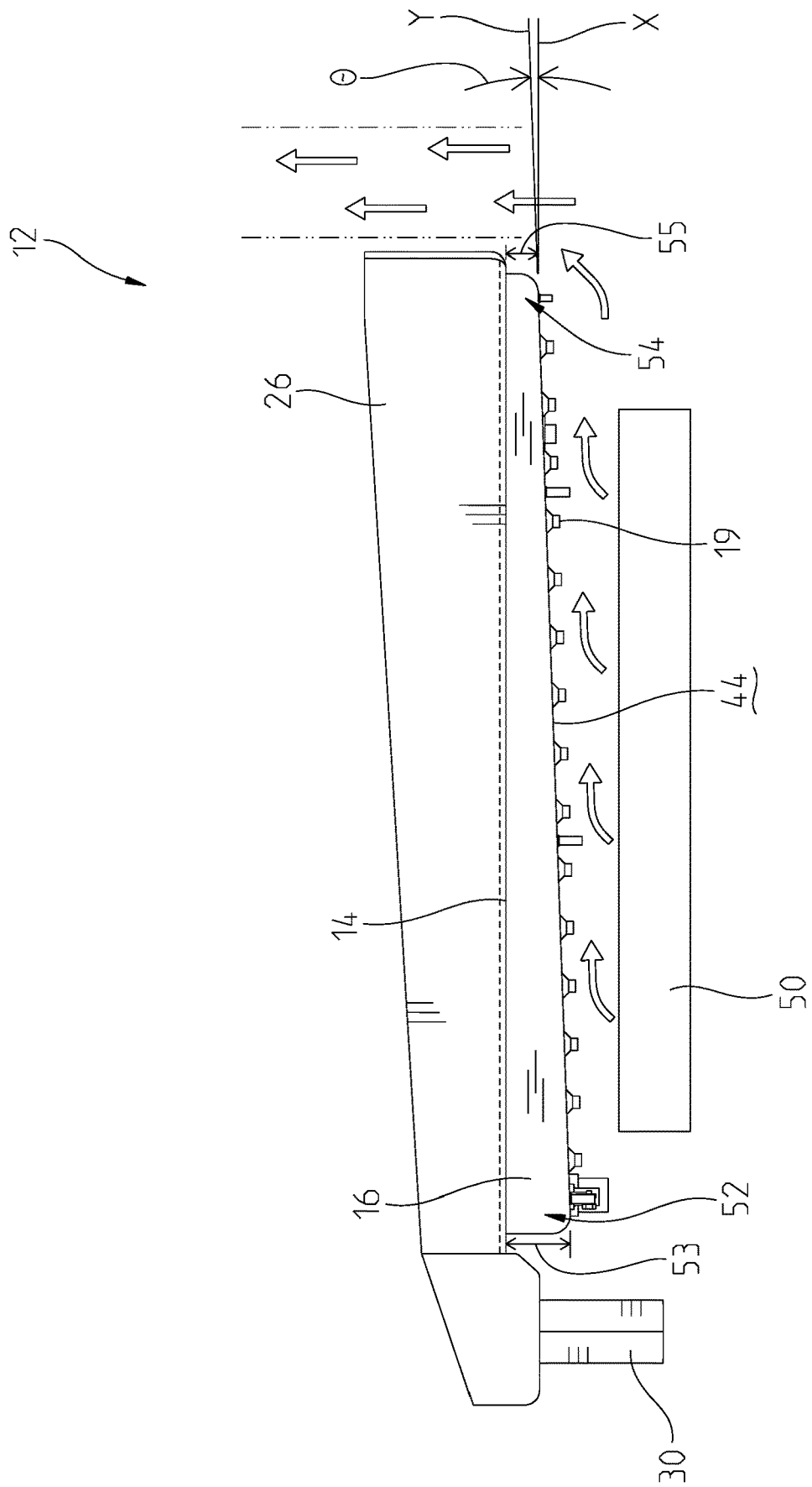
FIG. 21 is a left side view of the steam chamber assembly of FIG. 18, with a partial cutaway to illustrate heat exhaust pathways.

The array of stays 19 projecting below surface 44 induces a turbulent flow of gases passing along surface 44. This turbulence may be especially beneficial where heating element 20 (FIG. 16) is a gas burner 50, as best shown in FIG. 21 and discussed further below. In these embodiments and with further reference to FIG. 21, gas burner 50 may be positioned below the lower surface 44 of the bottom plate 16. When gas burner 50 is used as heating element 20, heated flue gases may rise from gas burner 50, transferring heat to bottom plate 16 and thus inducing steam to form in steam chamber 12 for heating of cooking surface 22 (FIG. 4). This heat transfer is enhanced by the configuration of stays 19 by both increased surface area, and by better fluid mechanics, discussed in turn below.

FIG. 19 is a front view of steam chamber 12 illustrating top plate 14 and bottom plate 16, showing an array of stays 19 having projecting lower portions extending below lower surface 44 of bottom plate 16. In the embodiments of at least FIGS. 18 and 19, the surface area available for heat transfer to bottom plate 16 is substantially increased as compared to a flat undersurface, because each of the exposed lower portions of stays 19 presents additional surface area capable of transferring heat from burner 50 to the interior of steam chamber 12.

FIG. 20 is a cutaway perspective view of a portion of steam chamber 12 with top plate 14 surrounded by sidewalls 26 and welded to bottom plate 16. The downwardly projecting portions of stays 19 are each illustrated extending from lower surface 44 of bottom plate 16 by a length 56. In embodiments, the length 56 of each projected stay portion may range from 0.25 inches to 0.50 inches. In one exemplary embodiment, the length 56 is 0.31 inches.

Since projected portions of stays 19 extend below bottom plate 16, they are configured to interrupt an otherwise substantially laminar flow of flue gases along lower surface 44 and instead induce a turbulent flow of the flue gases. Thus turbulent flow causes swirls and eddies of flue gases as they advance along a generally front-to-back exhaust pathway A (further discussed below), thereby increasing the time and quality of contact between the hot flue gases and the conductive surfaces of the lower portion of steam chamber 12. This, in turn, increases the efficiency of operation by extracting additional heat from the flue gases, because the turbulent flow creates a longer and more thorough heat-transferring contact between the flue gases and the stays 19 and bottom plate 16. As previously described with reference to FIGS. 14 and 16-17, heat transfer from heat source 20 (e.g., gas burner 50) to bottom plate 16 causes boiling of the fluid F within in steam chamber 12. An increased heat transfer to bottom plate 16 and stays 19 may thus increase the amount of steam in steam chamber 12 and heat transferred to cooking surface 22 for a given energy input. Further, in the embodiment of FIGS. 18-21, the projecting lower portions of stays 19 are positioned in direct contact with heated flue gas, such that the internal temperature of stays 19 is increased in comparison to stays 18 shown and described with respect to FIG. 14, in which stays 18 are substantially flush with bottom plate 16.

Figure 5:
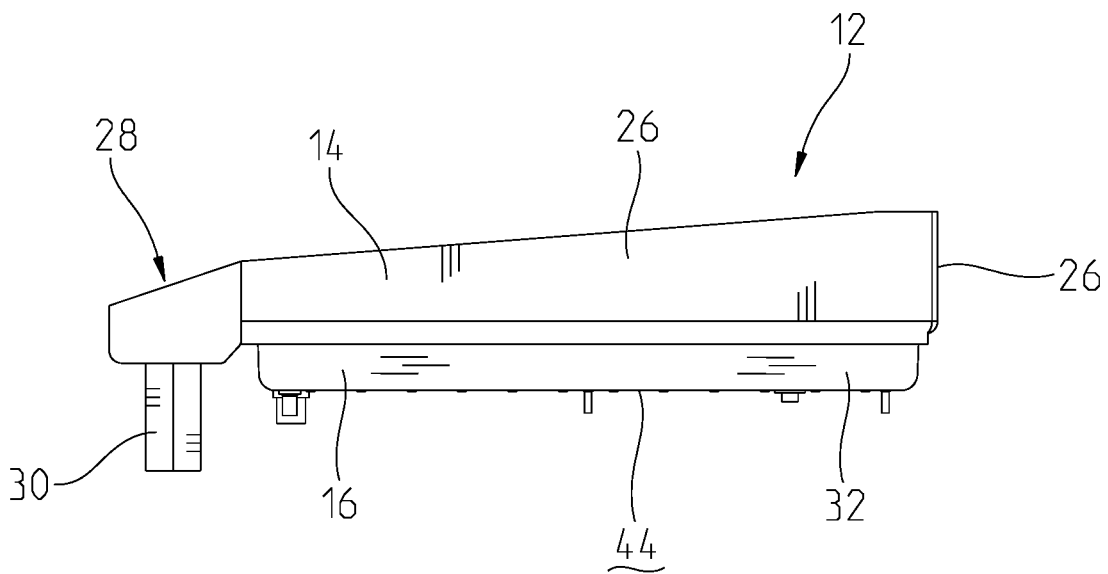
FIG. 5 is a side elevation view of the steam chamber assembly of FIG. 4.
Figure 6:
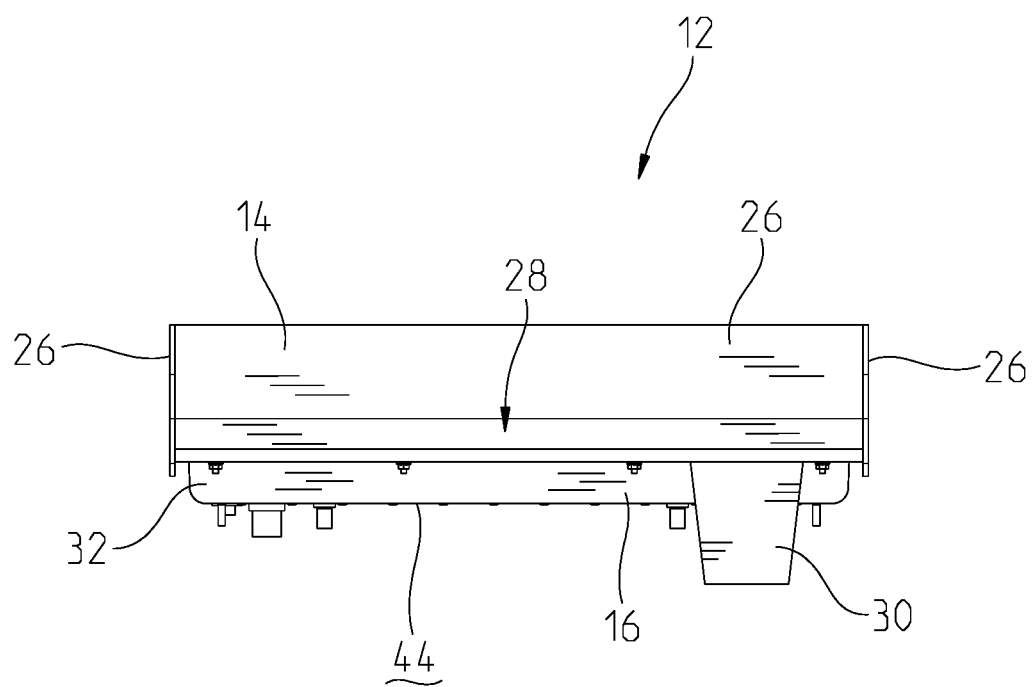
FIG. 6 is a front elevation view of the steam chamber assembly of FIG. 4.

As best illustrated in FIG. 21, lower surface 44 of bottom plate 16 may be upwardly angled along a front-to-back direction with respect to the top plate 14 positioning illustrated in at least FIG. 5. FIG. 21 illustrates a left side view of steam chamber 12 comprising top plate 14 and bottom plate 16, with bottom plate 16 having a front portion 52 and a back portion 54. Front portion 52 includes a front depth 53 and back portion 54 includes a back depth 55. Back depth 55 may be less than front depth 53, while cooking surface 22 maintains a relatively level position from a front portion to a back portion. In embodiments, the difference between back depth 55 and front depth 53 may be a value of zero inches or a small value, such as 0.1 inches, to 0.5 inches. In one exemplary embodiment, the value of the difference in height is approximately 0.25 inches.

This reduced back depth 55 relative to front depth 53 causes lower surface 44 to align with an angled plane Y that has an angle θ relative to a horizontal plane X, while horizontal plane X is generally parallel to cooking surface 22 such that cooking surface 22 is horizontally oriented, i.e., substantially perpendicular to gravity (FIG. 4). In embodiments, angle θ is between 0 degrees (i.e., level with no draft) or small value such as 1 degree, and 5 degrees. In one exemplary embodiment, angle θ is approximately 3 degrees.

As a result of the undersurface 44 being angled as shown, flue gases that might otherwise accumulate under bottom plate 16 and above gas burner 50 can more easily flow rearwardly and out from under bottom plate 16 along the heat exhaust pathway of arrows A, as the angled undersurface 44 steadily expands the exhaust volume along a front-to-back direction until the gases are allowed to be exhausted at the rear of the griddle 12 to leave the system (e.g., vertically along a rear portion of sidewall 26 of top plate 14 as shown). The angled undersurface 44 and resulting exhaust pathway A additionally allows for increased airflow to pass between gas burner 50 and bottom plate 16. In this way, the angling of bottom plate 16 reduces the potential amount of accumulated stagnant flue gases between gas burner 50 and bottom surface 44 of bottom plate 16, thereby increasing the overall combustion performance of gas burner 50. Moreover, minimized accumulation of stagnant flue gases below bottom plate 16 increases the combustion efficiency and decreases or eliminates carbon monoxide build up, thereby positively affecting performance of steam chamber 12.

Additionally, as best illustrated in FIG. 21, as bottom surface 44 of bottom plate 16 reduces in depth from front portion 52 to back portion 54, stays 19 may have varying lengths within the array to accommodate the difference in value between front depth 53 and back depth 55. In this way, stays 19 may vary in length such that each of projecting portions of stays 19 may define an equal distance from lower surface 44. In other embodiments, stays 19 may maintain a consistent length, such that the portions of stays 19 projecting below surface 44 have a longer length 56 (FIG. 19) in the stays 19 positioned towards back portion 54 as compared to the relatively shorter lengths 56 in the stays 19 positioned towards the front portion 52. The increase in length among various projecting lower portions of stays 19 may correspond to the difference in depth between front depth 53 and back depth 55. While the embodiments of FIGS. 18-21 are described with use of gas heating of steam griddle 10, the configuration of stays 19 and their downwardly projecting lower portions, as well as differing depths across bottom plate 16, may be used in combination with an electrically heated steam griddle 10.

Additional details of exemplary cooking apparatuses, any or all of which may be implemented in griddle 10 as described herein, are described in U.S. Pat. Nos. 7,987,772, 9,066,523, 10,092,128, 9,423,150, 10,154,761, 6,539,839, 10,376,097, and 6,730,891, and in U.S. Patent Application Publication Nos. 2013/0231740 and 2018/0368614. The entire disclosures of all of the aforementioned patents and patent application publications are hereby expressly incorporated herein by reference.

While this invention has been described as having exemplary designs, the present invention may be further modified with the spirit and scope of this disclosure. Further, this application is intended to cover such departures from the present disclosure as come within known or customary practice in the art to which this invention pertains.

What is claimed is:

1. A steam chamber comprising:
    a lower plate;
    an upper plate having a cooking surface and undersurface opposite the cooking surface; and
    at least one stay having an upper end welded to the upper plate and an opposed lower portion fixed to and extending through the lower plate, such that the at least one stay has a stay portion projecting below the lower plate.

2. The steam chamber of claim 1, wherein the cooking surface has a deviation from planarity of less than 1.5 thousandths of an inch throughout an area adjacent to the weld.

3. The steam chamber of claim 1, wherein the upper end of the at least one stay is friction welded to the upper plate.

4. The steam chamber of claim 1, wherein the upper plate defines a thickness between the cooking surface and the undersurface, the thickness is between 0.1 inches and 0.25 inches.

5. The steam chamber of claim 1, wherein the lower plate includes at least one hole to receive the lower portion of the at least one stay.

6. The steam chamber of claim 1, wherein an outer surface of the lower portion of the at least one stay is welded to a wall surface adjacent a respective hole of the lower plate.

7. The steam chamber of claim 1, wherein the stay portion extends below a bottom surface of the lower plate by a value between 0.25 and 0.50 inches.

8. The steam chamber of claim 1, wherein the at least one stay has a diameter between ¼ inch and ½ inch, and wherein the at least one stay and the upper plate are made of stainless steel.

9. The steam chamber of claim 1, wherein the lower plate comprises a wall extending around a periphery of the lower plate and welded to the undersurface of the upper plate, such that the upper plate, the lower plate, and the at least one stay cooperate to define a hermetically sealed chamber.

10. The steam chamber of claim 1, wherein the at least one stay comprises an array of stays evenly spaced across the undersurface of the upper plate, each of the array of stays having the stay portion projecting below the lower plate.

11. The steam chamber of claim 10, wherein the lower plate includes an array of holes each sized to receive the lower portion of one of the array of stays, the lower portion of each of the array of stays welded to a wall surface adjacent one of the array of holes of the lower plate, each of the array of stays extending through and below a lower surface of the lower plate.

12. A steam chamber comprising:

an upper plate having a cooking surface and undersurface opposite the cooking surface, the cooking surface configured in a horizontal orientation; and a lower plate, the lower plate having a front portion adjacent an inlet of an exhaust pathway defining a front depth relative to the cooking surface, a back portion adjacent an outlet of the exhaust pathway defining a back depth relative to the cooking surface, and a lower surface extending from the front portion to the back portion, the front depth being greater than the back depth of the lower plate to define a difference therebetween, such that the lower surface defines a plane forming an angle relative to a plane of the cooking surface.

13. The steam chamber of claim 12, wherein the difference between the front depth and the back depth of the lower plate is between 0.1 and 0.5 inches.

14. The steam chamber of claim 12, wherein the angle formed between the lower plate and longitudinal axis parallel to the cooking surface is between 1 to 5 degrees.

15. The steam chamber of claim 12, further comprising at least one stay having an upper portion welded to the upper plate and an opposed lower portion fixed to the lower plate.

16. The steam chamber of claim 15, wherein the at least one stay extends through and below the lower plate.

\* \* \* \* \*